UNITED STATES PATENT OFFICE.

FRIDOLIN HEFTI, OF ALTSTETTEN, NEAR ZURICH, SWITZERLAND, ASSIGNOR TO FARBENFABRIKEN VORM. FRIEDR. BAYER & CO., OF ELBERFELD, GERMANY, A CORPORATION OF GERMANY.

BROMODIETHYLACETYLISOCYANATE.

1,086,294.  Specification of Letters Patent.  Patented Feb. 3, 1914.

No Drawing.  Application filed May 2, 1913.  Serial No. 765,074.

*To all whom it may concern:*

Be it known that I, FRIDOLIN HEFTI, doctor of philosophy, chemist, citizen of the Swiss Republic, residing at Altstetten, near Zurich, Switzerland, have invented new and useful Improvements in Bromodiethylacetylisocyanate, of which the following is a specification.

My invention relates to the manufacture and production of the hitherto unknown bromodiethylacetylisocyanate:

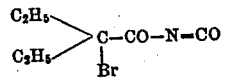

being a technically valuable compound. It can be obtained by treating bromodiethylacetylbromid or chlorid with a silver or mercury salt of isocyanic acid. The new product is a limpid oil boiling at 110–114° C. under a pressure of 70 mm. It is soluble in petrolether, ligroin and benzene and yields bromodiethylacetcarbamid with ammonia and bromodiethylacetylphenylcarbamid with anilin.

In order to illustrate the new process more fully the following example is given, the parts being by weight:—160 parts of potassium cyanate dissolved in 2000 parts of water are added to a solution of 520 parts of mercuro nitrate in small quantity of water while the liquid is stirred. The salt precipitated is filtered off, washed with water and dried. Subsequently 120 parts of this salt are heated in a vessel provided with a cooler and a stirrer with 500 parts of petrolether and 125 parts of bromo-diethylacetylbromid. The mixture is filtered, the petrolether distilled off and the residue is distilled *in vacuo*.

I claim:—

As a new article of manufacture the bromodiethylacetylisocyanate having most probably the formula:

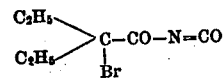

which is a limpid oil boiling at from 110–114° C. under a pressure of 70 mm.; soluble in petrolether, ligroin and benzene; and yielding bromodiethylacetylcarbamid with ammonia and bromodiethylacetylphenylcarbamid with anilin, substantially as described.

In testimony whereof I have hereunto set my hand in the presence of two subscribing witnesses.

FRIDOLIN HEFTI.

Witnesses:
CARL GUBLER,
AUGUST RUEGG.